United States Patent [19]
Peters

[11] 3,924,200
[45] Dec. 2, 1975

[54] ATOMIC STANDARD WITH VARIABLE STORAGE VOLUME

[75] Inventor: Harry E. Peters, Seabrook, Md.

[73] Assignee: The United States of America as represented by the United States National Aeronautics and Space Administration Office of General Counsel-Code GP, Washington, D.C.

[22] Filed: Oct. 3, 1974

[21] Appl. No.: 511,887

[52] U.S. Cl. .................................. 331/94; 331/3
[51] Int. Cl.² .......................................... H01S 1/00
[58] Field of Search .......... 331/94, 3; 324/.5 R, .5 F

[56] References Cited
OTHER PUBLICATIONS

Brenner, "Absolute Frequency of the Hydrogen Maser Using a Flexible Storage Bulb," Journal of Applied Physics, Vol. 41, June 1970, pp. 2942-2950.

Debely, "Hydrogen Maser with Deformable Storage Bulb," The Review of Scientific Instruments, Vol. 41, Sept. 1970, pp. 1290-1292.

*Primary Examiner*—Siegfried H. Grimm
*Attorney, Agent, or Firm*—Robert F. Kempf; Ronald F. Sandler; John R. Manning

[57] ABSTRACT

A cylindrical, convoluted, flexible bellows is used to form an atomic or molecular storage vessel with constant surface area and surface properties but adjustable volume. When utilized as a storage bulb inside an atomic or molecular frequency standard such as a hydrogen maser, it provides an apparatus for obtaining an extremely accurate measurement of the frequency deviation caused by the interaction of gas atoms (or molecules) with the vessel wall surface (i.e., the so-called "wall shift").

2 Claims, 2 Drawing Figures

ATOMIC STANDARD WITH VARIABLE STORAGE VOLUME

ORIGIN OF THE INVENTION

The invention described herein was made by an employee of the United States Government and may be manufactured and used by or for the government for governmental purposes without the payment of any royalties thereon or therefor.

BACKGROUND OF THE INVENTION

1. Field of The Invention

This invention relates generally to atomic or molecular frequency standards and more particularly to improvements in an atomic hydrogen maser.

2. Description of the Prior Art

Atomic or molecular devices, for example the hydrogen maser, the hydrogen beam storage device, the cesium beam standard, the rubidium cell resonance standard, or the rubidium maser have very precise and stable frequencies of operation which are accurately related to quantum transitions in atoms or molecules. The stability and precision of these devices are improved in some cases by storage of the atoms or molecules in a vessel, such that the interaction time of the particles with a transition-including R.F. electromagnetic field is greatly enhanced. The length of the interaction time establishes the basis for the very small frequency variations and tremendous stability of these atomic or molecular standards. However, storing the atoms or molecules in a vessel gives rise to a small, though important, frequency deviation, due to interaction of the said atoms or molecules with the surfaces of the container. This deviation is termed the wall shift.

It has been observed that the amount of wall shift is very accurately related and is in almost direct proportion to the surface area-to-volume (A/V) ratio of the vessel. The present invention provides a means for accurately and continuously varying the volume of the storage vessel (bulb) while the surface area and surface properties are kept constant. This is done in such a way that other critical operating conditions are not degraded. The wall shift measurements thereby made possible are markedly superior to those under the prior art. Previous inventions, experiments, and techniques illustrate the numerous attempts to exploit the dependence of wall shift on the area-to-volume ratio in order to measure and control the wall shift. The measurements obtained through use of the disclosed invention are more intrinsically accurate than those under the prior art by approximately two orders of magnitude.

One technique was that of physically interchanging storage bulbs of different dimensions in order to get a number of different values of the A/V ratio. However, the surface conditions (coatings, etc.) of the bulbs would vary in an unpredictable and unmeasurable way, and the device would have to be disassembled to exchange bulbs.

Deformable "squeeze bottle" bulbs have been used, but the stress required to significantly change the A/V ratio introduces sufficient strain so as to alter the surface properties of the vessel and, therefore, as to introduce unmeasurable errors.

In yet another approach, the conical film method, one end of an otherwise rigid storage volume was covered by a flexible film which could be pushed in or pulled out, thereby creating two different volumes having the same surface area. While the wall shift itself may be theoretically determined with great accuracy with such a device, there are introduced several new frequency uncertainties and problems: magnetic field inhomogeneity, mechanical instabilities, gross inefficiency of hydrogen (or other) supply, difficulty in achieving oscillation due to unfavorable physical factors, etc.

Continuity of data in measurement of output frequency versus bulb volume or surface area-to-volume ratio could not be achieved by any of these prior art methods. Thus, the ability to measure second order effects was severely limited. Consequently, the ability to achieve highly accurate wall shift measurements was also limited.

OBJECTS AND SUMMARY OF THE INVENTION

It is a primary object of the present invention to provide an improved atomic or molecular frequency standard.

Another object is to provide an apparatus for more accurately measuring the frequency deviation produced in atomic or molecular frequency standards by the interaction of the stored atoms or molecules with the surface of the storage vessel, i.e., the socalled wall shift.

A further object is to provide an atomic or molecular storage vessel the volume of which may be precisely varied while a constant surface and essentially unchanged surface conditions are maintained.

A still further object is to provide an atomic or molecular storage vessel the volume of which may be precisely varied from outside the vacuum enclosure in which the said vessel is contained.

These and other objects of the invention are achieved by utilizing a cylindrical, convoluted, flexible bellows as a storage vessel. A screw mechanism is used to precisely adjust the length of the cylinder along its axis, which simultaneously adjusts the volume of the vessel. The surface area is a constant, unchanged value at all times. By extending the adjusting screw outside the vacuum enclosure, it is possible to continuously and precisely vary the surface area-to-volume ratio of the vessel without disturbing the integrity of the inside environment.

The following description of an embodiment of the invention, taken in conjunction with the accompanying drawings will provide a better understanding of the invention. The novel features are set forth with particularity in the appended claims.

It should be reiterated that the invention herein described can be used in numerous types of atomic or molecular frequency standards; the hydrogen maser embodiment set forth below is for illustrative purposes only. Other embodiments and applications will be readily apparent to those familiar with the art.

DESCRIPTION OF THE INVENTION

Figure 1:
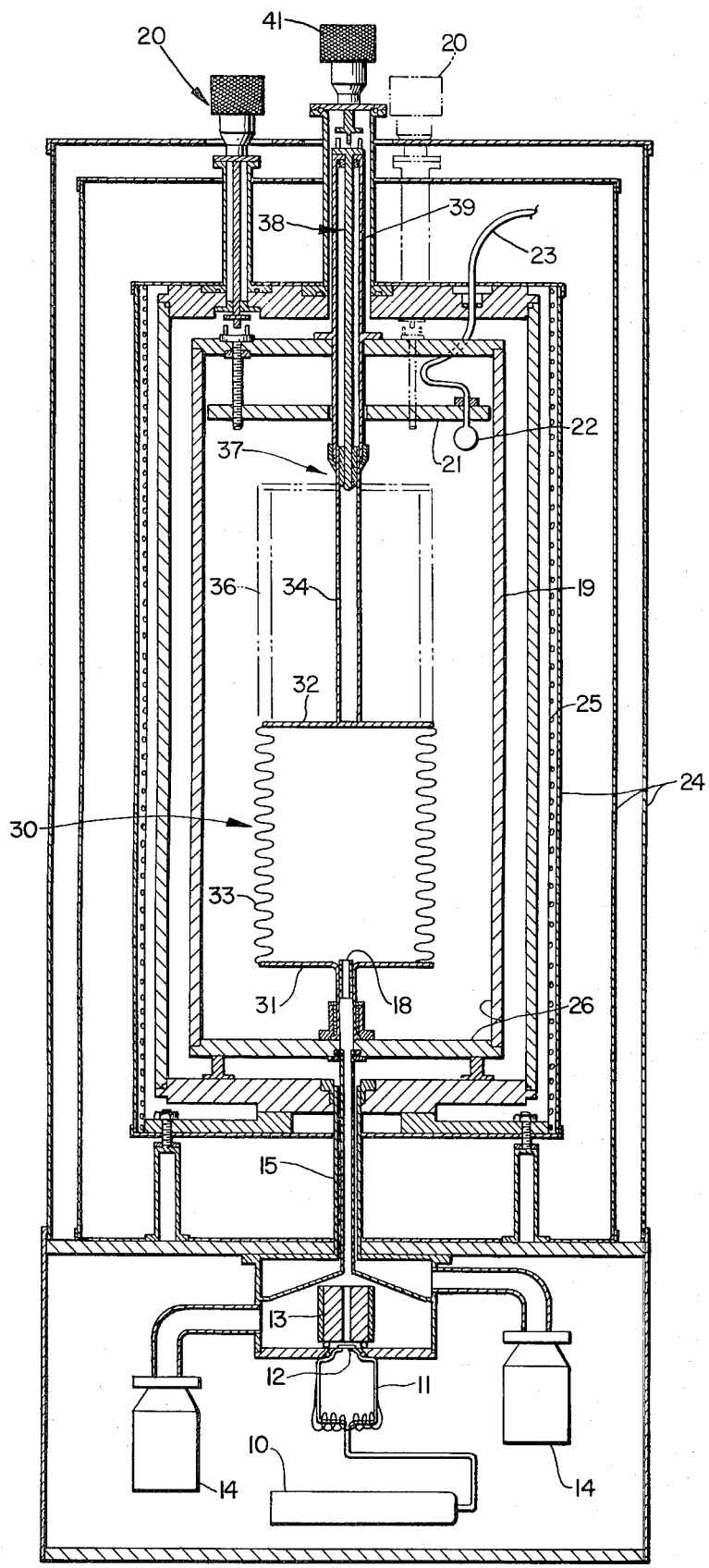
FIG. 1 is a diagrammatic representation of a hydrogen maser apparatus employing a variable volume atomic storage vessel according to the present invention.

FIG. 1 depicts a hydrogen maser utilizing the variable volume atomic storage vessel which is the subject of this disclosure. For use as a frequency standard, its operation may be briefly described as follows: A hydrogen supply bottle 10 supplies molecular hydrogen to an R.F. source 11 which dissociates the molecules and forms a beam of atomic hydrogen. The atomic hydrogen beam is collimated by source beam collimator 12 before passing through state selector 13. The state selector 13 is a magnetic device which defocusses the atoms of lower energy state, which atoms are then pumped away by ion vacuum pumps 14; the higher energy state atoms, still in the beam, pass via connecting tube 15 and a collimator 18 into the variable volume bulb 30, herein shown in a compressed position. The atoms remain in the bulb on the order of 1 second. The variable volume bulb 30 is located in a microwave cavity 19 tuned to the hydrogen hyperfine transition frequency. Tuning of the cavity is accomplished by using cavity frequency adjust mechanism 20 to move cavity tuning plate 21, thereby changing the physical size and resonance frequency of the cavity. Microwave oscillations occur at the hydrogen hyperfine transition frequency due to stimulated emission of radiation if the beam flux is sufficiently high and a signal is produced in the cavity 19. This signal is detected by means of a small R.F. output coupling loop 22 and is provided for outside use via R.F. output cable 23 connected thereto. Magnetic shields 24 are designed to reduce the ambient field, and a small uniform field is produced by magnetic field coil 25. The internal processes take place in a vacuum provided by vacuum enclosure 26 and ion vacuum pumps 14.

The cavity of the maser illustrated in FIG. 1 is greatly elongated over usual practice in the past, so that very good oscillation parameters (e.g. "filling factor", oscillation threshold, "line Q", etc.) are easy to maintain with a large range of bulb volume variation (i.e., at least a 2 to 1 range in volume between maximum and minimum values).

Figure 2:
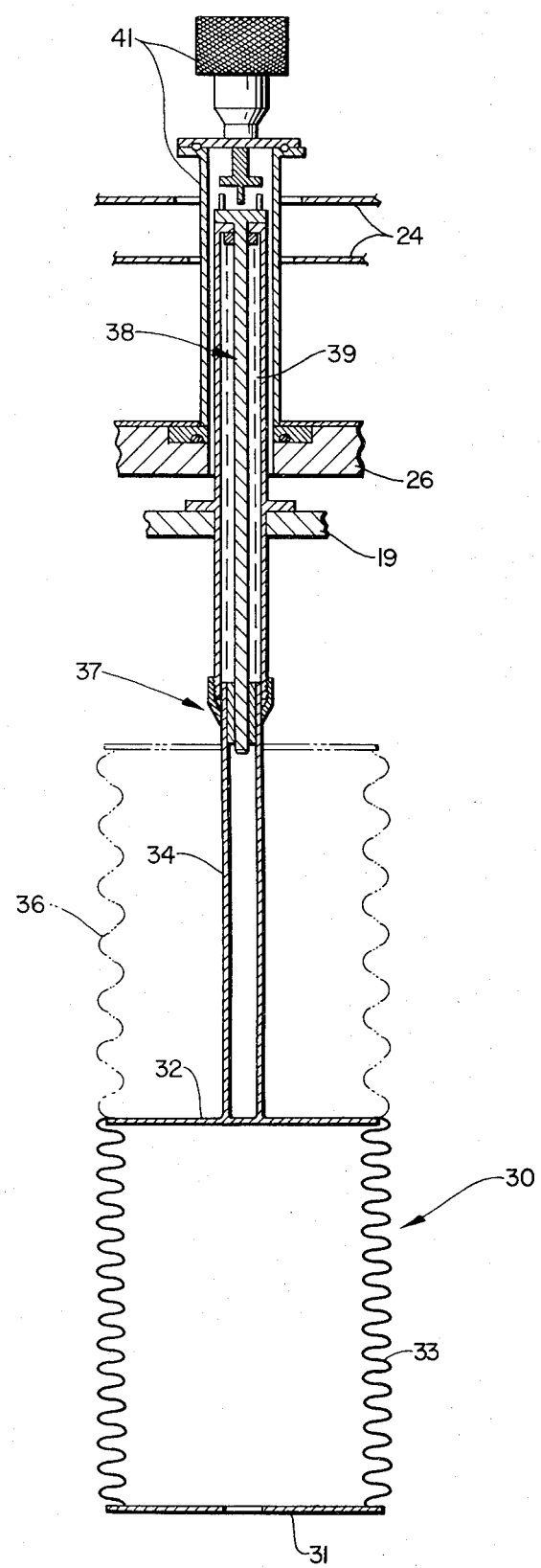
FIG. 2 is a diagrammatic representation of an embodiment of the variable volume atomic or molecular storage vessel as taught by the present invention.

Reference is now made to FIG. 2, which depicts the variable volume atomic storage vessel (bulb) 30 in detail. Bottom plate 31 and top plate 32 are circular plates made of quartz, or other rigid material with the desired attributes, which have been coated with TFE or FEP teflon, or similar substances, in order to obtain desired surface properties. Bottom plate 31 has an opening through which the hydrogen atoms enter and exit the bulb. The bulb wall 33 is composed of a semirigid material, preferably FEP or TFE teflon, or other material TFE or FEP coated, with is arranged as a cylindrical bellows (of approximately constant average diameter) with numerous convolutions along the wall. The bellows configuration permits the vessel to be compressed (as shown) or expanded (as represented by dotted line 35) along its longitudinal axis. Bottom plate 31 is fixed in position with respect to the cavity 19. The position of top plate 32 can be varied, so as to change the length of the cylindrical vessel; top plate 32, however, is at all times parallel to bottom plate 31. Therefore, the volume of the vessel may be directly calculated once its length is known.

Top plate 32 is attached to one end of hollow quartz tube 34. Fastened inside the opposite end of quartz tube 34 is a threaded plastic nut 37 adapted to receive a tapped shaft (rod) of similar thread. Threaded rod 38 is such a shaft with a thread to match that of plastic nut 37. The said threaded rod 38 is enclosed in a hollow, cylindrical casing 39. A high vacuum rotary feed-through 41 is incorporated as a mechanism which can be used to couple to and turn threaded rod 38 from outside the vacuum environment. Threaded rod 38 can be rotated by means of high vacuum rotary feed-through 41; it is otherwise fixed in position with respect to the remainder of the apparatus. Rotating threaded rod 38 will therefore cause the plastic nut 37 to traverse the threaded rod along its length. Since plastic nut 37 is rigidly attached to quartz tube 34, and quartz tube 34 is rigidly fastened to top plate 32, the position of top plate 32 will change in correspondence with any change in position of plastic nut 37. Thus, turning the high vacuum rotary feed-through 41 will cause threaded rod 38 to turn, changing the distance between top plate 32 and bottom plate 31, and thereby changing the volume of the variable volume vessel 30, without changing it surface area.

Although a particular embodiment of the invention has been described and illustrated herein, it is recognized that modifications, variations, and alternate embodiments may readily occur to those skilled in the art without departing from the spirit of the invention. Thus it is intended that all such modifications and equivalents to the particular embodiment are covered by the appended claims.

What is claimed is:

1. In an atomic or molecular frequency standard, a variable volume, constant surface area storage bulb comprising a cylindrical, convoluted, flexible bellows having upper and lower ends which are capped by circular quartz plates, said lower end being mounted to a stationary portion of said standard; screw means for varying the length of said bellows, said screw means being rotationally mounted to said stationary portion of said standard, one end of said screw means being attached to said upper end of said bulb with the other end of said screw means extending outside said standard, said screw means imparting longitudinal movement to said upper end of said bulb relative to said lower end thereof as a function of rotation of said screw means for accurate adjustment of the volume of said bulb from outside said standard.

2. In an atomic or molecular frequency standard of the type including a vacuum chamber enclosing a storage bulb, an arrangement comprising a storage bulb which has a constant surface area and a continuously adjustable volume, the volume of said bulb being adjustable by varying the length of said bulb along one axis; screw means extending through said vacuum chamber, one end of said screw means being attached to one end of said bulb, a rotary seal being formed between said screw means and said vacuum chamber, rotation of said screw means from outside said vacuum chamber causing longitudinal movement of said one end of said bulb relative to the other end thereof, whereby accurate adjustment of the volume of said bulb is provided.

* * * * *